(12) United States Patent
Talpey et al.

(10) Patent No.: US 9,298,652 B2
(45) Date of Patent: Mar. 29, 2016

(54) MODERATED COMPLETION SIGNALING

(71) Applicant: Microsoft Corporation, Redmond, WA (US)

(72) Inventors: Thomas M. Talpey, Stow, MA (US); Gregory R. Kramer, Bothell, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 303 days.

(21) Appl. No.: 13/841,728

(22) Filed: Mar. 15, 2013

(65) Prior Publication Data

US 2014/0281087 A1    Sep. 18, 2014

(51) Int. Cl.
*G06F 13/24*    (2006.01)

(52) U.S. Cl.
CPC ........................................ *G06F 13/24* (2013.01)

(58) Field of Classification Search
CPC ....................................................... G06F 13/24
USPC ................................................. 710/260, 263
See application file for complete search history.

(56) References Cited

U.S. PATENT DOCUMENTS

| | | | |
|---|---|---|---|
| 6,434,630 B1 * | 8/2002 | Micalizzi, Jr. | ........ G06F 13/385 710/263 |
| 7,065,598 B2 | 6/2006 | Connor et al. | |
| 7,987,307 B2 | 7/2011 | Sarangam et al. | |
| 8,244,946 B2 | 8/2012 | Gupta et al. | |
| 2004/0252709 A1 * | 12/2004 | Fineberg | ........................ 370/412 |
| 2010/0274940 A1 | 10/2010 | Ahmad et al. | |
| 2011/0093637 A1 * | 4/2011 | Gupta et al. | .................. 710/263 |
| 2012/0239832 A1 | 9/2012 | Subramanian et al. | |
| 2012/0254492 A1 | 10/2012 | Li et al. | |

OTHER PUBLICATIONS

Ahmad, et al., "Improving Performance with Interrupt Coalescing for Virtual Machine Disk IO in VMware ESX Server", In Proceedings of International Workshop on Virtualization Performance: Analysis, Characterization, and Tools, Apr. 2009, 9 pages.

* cited by examiner

*Primary Examiner* — Tim T Vo
*Assistant Examiner* — Phong H Dang
(74) *Attorney, Agent, or Firm* — Aneesh Mehta; Doug Barker; Micky Minhas (57) ABSTRACT

The moderation of event notifications from a network interface card. The network interface card has multiple completion queues that queue of completed work. The moderation batches up this completed work such that potentially multiple work requests are aggregated into a single event notification. This moderation reduces processing overhead since it spreads the overhead associated with a single interrupt to multiple event notifications The decision on moderation may be performed per connection, or even per constituent queue of the connection. The principles herein allow moderation to reduce overhead without slowing network throughput.

20 Claims, 4 Drawing Sheets

MODERATED COMPLETION SIGNALING

BACKGROUND

Computer networks have transformed the way modern mankind communicates. Conventionally, communication protocols have been operated by the operating system of the communicating computing systems. The communications take the form of network packets, which are transmitted over packet-switched networks, such as the Internet. The processing of network packets using the communication protocols takes processing cycles that could be used to perform other computing system functions, and often requires data be read and written over the memory bus a number of times. As network speeds increase, this use of processing cycles to process sent and received packets can threaten to significantly slow the other functionality of the computing system.

While processing speeds are increasing, network speeds are increasing even faster. Thus, the continued use of the operating system and host processors to processing sent and received packets could overwhelm the capabilities of the host processors to perform other tasks. Remote Direct Memory Access (RDMA) refers to the ability to perform direct memory access of the memory locations of one computing system into the memory of another, perhaps remote, computing system, without using the operating system of either computing system. This preserves processing cycles and memory bus bandwidth at both computing systems, thereby rendering the computing systems more responsive to higher message dispatch and arrival rates.

The subject matter claimed herein is not limited to embodiments that solve any disadvantages or that operate only in environments such as those described above. Rather, this background is only provided to illustrate one exemplary technology area where some embodiments described herein may be practiced.

BRIEF SUMMARY

At least some embodiments described herein relate to the moderation of interrupts from a network interface card. The network interface card has multiple completion queues that queue completed work. The moderation batches this completed work such that potentially multiple work requests are aggregated into a single interrupt. The decision on moderation may be performed per connection, or even per constituent queue of the connection.

This Summary is not intended to identify key features or essential features of the claimed subject matter, nor is it intended to be used as an aid in determining the scope of the claimed subject matter.

BRIEF DESCRIPTION OF THE DRAWINGS

In order to describe the manner in which the above-recited and other advantages and features can be obtained, a more particular description of various embodiments will be rendered by reference to the appended drawings. Understanding that these drawings depict only sample embodiments and are not therefore to be considered to be limiting of the scope of the invention, the embodiments will be described and explained with additional specificity and detail through the use of the accompanying drawings in which.

DETAILED DESCRIPTION

At least some embodiments described herein relate to the moderation of interrupts caused by a network interface card. The network interface card has multiple completion queues that store completed work. Without moderation, whenever a work completion is added to a completion queue, the network interface card issues an interrupt to the host processor to signal the presence of an added work completion. Unfortunately, interrupts incur significant processing overhead. For high speed networks, packets are being delivered and sent much more frequently. Thus, interrupt handling can significantly impede the host processor when handling high speed networks.

The goal of moderation is to allow a single interrupt to signal the arrival of multiple work completions, so that the cost of processing the interrupt can be spread over several work completions. Choosing an appropriate batch size involves balancing this benefit against introducing too much latency by waiting too long for more work requests to complete. Interrupt moderation attempts to find the sweet spot by minimizing both 1) the frequency of interrupts that have to be handled, and 2) the perceived latency of the work requests that have been issued.

Conventional moderation is performed over the entire network interface, effectively applying the same moderation parameters to all connections that are associated with the interface, even if those connections have traffic patterns that vary widely. In accordance with the principles described herein, the decision on moderation may be performed per connection, or even per completion queue. Thus, by allowing the moderation balance to be made at a more refined granularity, a better balance may be made to find the sweet spot for each connection, and for each completion queue. This may dramatically improve the performance of the system as a whole if there are a wide variety of traffic patterns across connections.

An introductory discussion of a computing system will be described with respect to FIG. 1. Then, the principles of interrupt moderation will be described with respect to FIGS. 2 through 4.

Computing systems are now increasingly taking a wide variety of forms. Computing systems may, for example, be handheld devices, appliances, laptop computers, desktop computers, mainframes, distributed computing systems, or even devices that have not conventionally been considered a computing system. In this description and in the claims, the term "computing system" is defined broadly as including any device or system (or combination thereof) that includes at least one physical and tangible processor, and a physical and tangible memory capable of having thereon computer-executable instructions that may be executed by the processor. The memory may take any form and may depend on the nature and form of the computing system. A computing system may be distributed over a network environment and may include multiple constituent computing systems.

Figure 1:
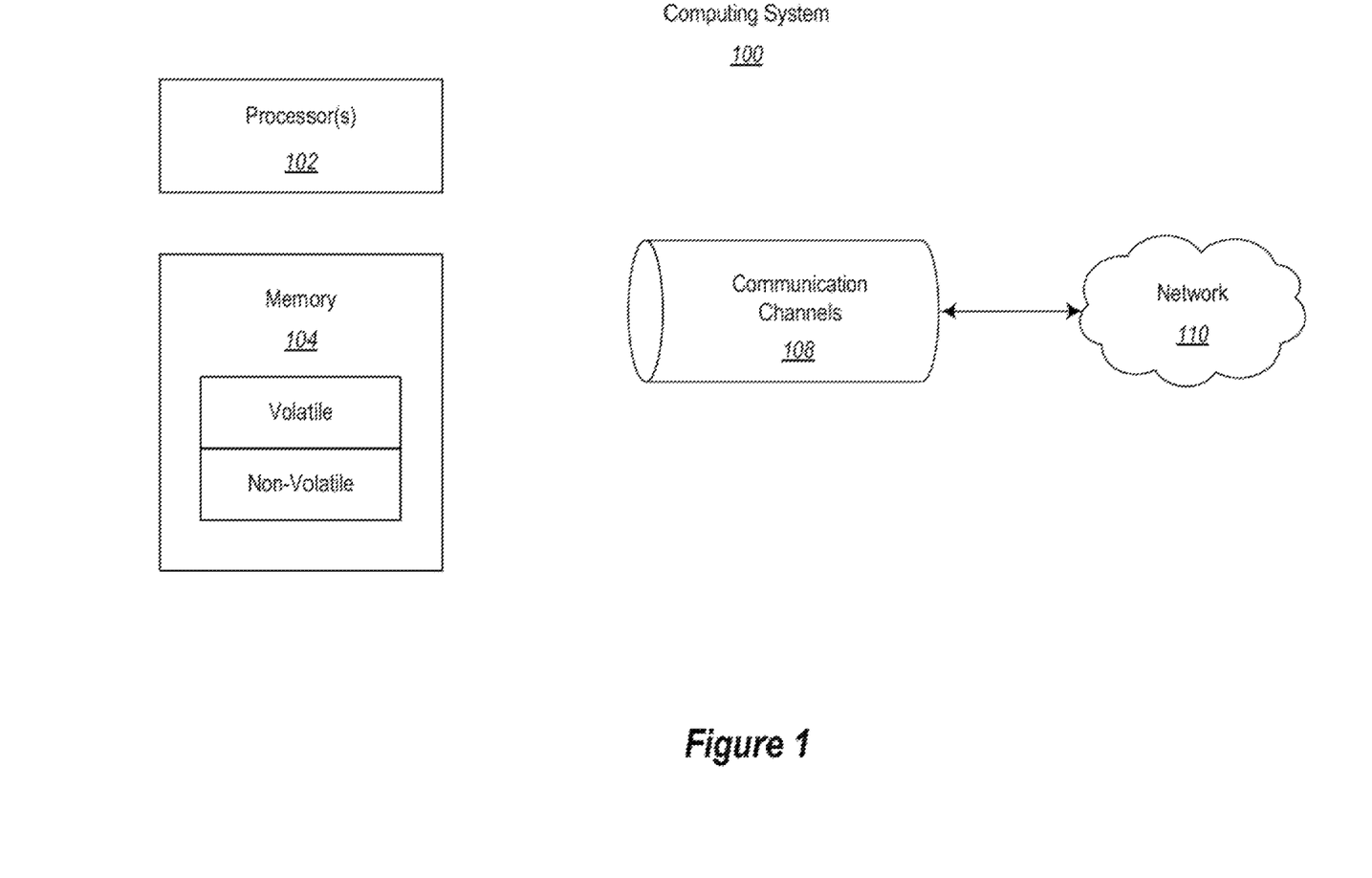
FIG. 1 abstractly illustrates a computing system in which some embodiments described herein may be employed.

As illustrated in FIG. 1, in its most basic configuration, a computing system 100 typically includes at least one processing unit 102 and memory 104. The memory 104 may be physical system memory, which may be volatile, non-volatile, or some combination of the two. The term "memory" may also be used herein to refer to non-volatile mass storage such as physical storage media. If the computing system is distributed, the processing, memory and/or storage capability may be distributed as well. As used herein, the term "executable module" or "executable component" can refer to software objects, routines, or methods that may be executed on the computing system. The different components, modules, engines, and services described herein may be implemented as objects or processes that execute on the computing system (e.g., as separate threads).

In the description that follows, embodiments are described with reference to acts that are performed by one or more computing systems. If such acts are implemented in software, one or more processors of the associated computing system that performs the act direct the operation of the computing system in response to having executed computer-executable instructions. For example, such computer-executable instructions may be embodied on one or more computer-readable media that form a computer program product. An example of such an operation involves the manipulation of data. The computer-executable instructions (and the manipulated data) may be stored in the memory 104 of the computing system 100. Computing system 100 may also contain communication channels 108 that allow the computing system 100 to communicate with other message processors over, for example, network 110.

Embodiments described herein may comprise or utilize a special purpose or general-purpose computer including computer hardware, such as, for example, one or more processors and system memory, as discussed in greater detail below. Embodiments described herein also include physical and other computer-readable media for carrying or storing computer-executable instructions and/or data structures. Such computer-readable media can be any available media that can be accessed by a general purpose or special purpose computer system. Computer-readable media that store computer-executable instructions are physical storage media. Computer-readable media that carry computer-executable instructions are transmission media. Thus, by way of example, and not limitation, embodiments of the invention can comprise at least two distinctly different kinds of computer-readable media: computer storage media and transmission media.

Computer storage media includes RAM, ROM, EEPROM, CD-ROM or other optical disk storage, magnetic disk storage or other magnetic storage devices, or any other tangible and/or physical medium which can be used to store desired program code means in the form of computer-executable instructions or data structures and which can be accessed by a general purpose or special purpose computer.

A "network" is defined as one or more data links that enable the transport of electronic data between computer systems and/or modules and/or other electronic devices. When information is transferred or provided over a network or another communications connection (either hardwired, wireless, or a combination of hardwired or wireless) to a computer, the computer properly views the connection as a transmission medium. Transmissions media can include a network and/or data links which can be used to carry desired program code means in the form of computer-executable instructions or data structures and which can be accessed by a general purpose or special purpose computer. Combinations of the above should also be included within the scope of computer-readable media.

Further, upon reaching various computer system components, program code means in the form of computer-executable instructions or data structures can be transferred automatically from transmission media to computer storage media (or vice versa). For example, computer-executable instructions or data structures received over a network or data link can be buffered in RAM within a network interface module (e.g., a "NIC"), and then eventually transferred to computer system RAM and/or to less volatile computer storage media at a computer system. Thus, it should be understood that computer storage media can be included in computer system components that also (or even primarily) utilize transmission media.

Computer-executable instructions comprise, for example, instructions and data which, when executed at a processor, cause a general purpose computer, special purpose computer, or special purpose processing device to perform a certain function or group of functions. The computer executable instructions may be, for example, binaries, intermediate format instructions such as assembly language, or even source code. Although the subject matter has been described in language specific to structural features and/or methodological acts, it is to be understood that the subject matter defined in the appended claims is not necessarily limited to the described features or acts described above. Rather, the described features and acts are disclosed as example forms of implementing the claims.

Those skilled in the art will appreciate that the invention may be practiced in network computing environments with many types of computer system configurations, including, personal computers, desktop computers, laptop computers, message processors, hand-held devices, multi-processor systems, microprocessor-based or programmable consumer electronics, network PCs, minicomputers, mainframe computers, mobile telephones, PDAs, pagers, routers, switches, and the like. The invention may also be practiced in distributed system environments where local and remote computer systems, which are linked (either by hardwired data links, wireless data links, or by a combination of hardwired and wireless data links) through a network, both perform tasks. In a distributed system environment, program modules may be located in both local and remote memory storage devices.

Figure 2A:
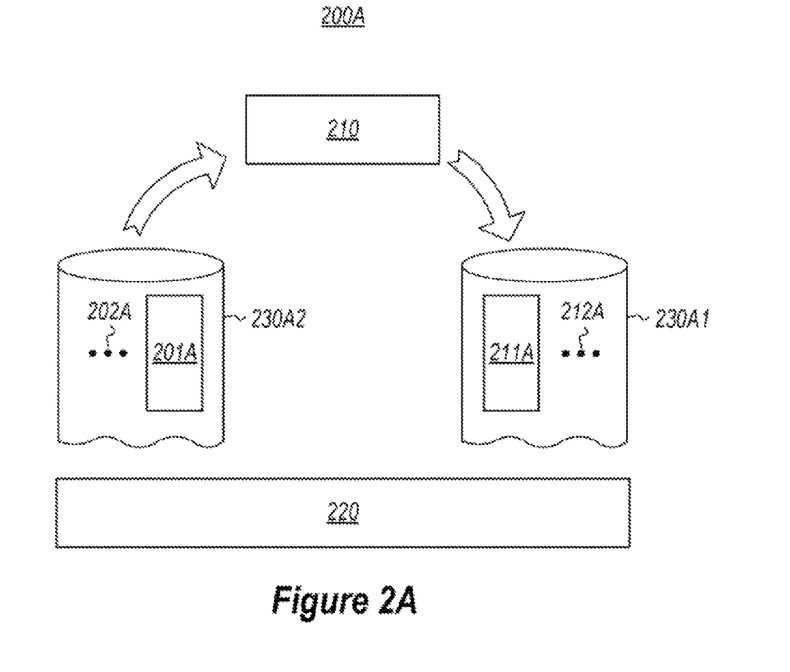
FIG. 2A illustrates a connection environment in which operational components associated with a single connection of a network interface card are shown.

FIG. 2A illustrates a connection environment 200A in which operational components associated with a single connection of a network interface card 220 are shown. Specifically, the network interface card 220 provides a work queue 211A and a completion queue 201A associated with the connection. However, the ellipses 212A illustrate that there may be more than one work queue associated with the same connection. Likewise, the ellipses 202A illustrate that there may be more than one completion queue associated with the same connection. The software 210 initiates a work request by providing the work request into one of the work queues 211A or 212A. Thus, the software 210 views the work queues 211A, 212A as being the beginning 230A1 of a network connection channel. The network interface card 220 processes the work request and places a work completion into one of the work completion queues 201A or 202A. A "work completion" comprises data that the software 220 or the environment of the software 220 may use to process the corresponding work request which has been completed. Thus, the software 210 views the completion queues 201A and 202A as being the end 230A2 of a network connection channel. The network connection that forms the beginning 230A1 and end 230A2 will also be referred to herein as the "network connection 230A".

Figure 2B:
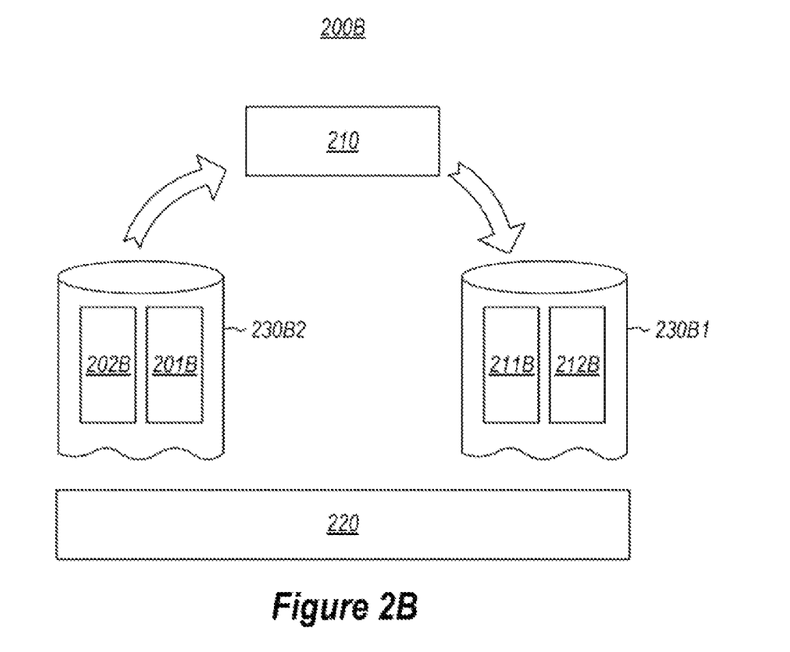
FIG. 2B illustrates a more specific embodiment of FIG. 2A in which there are two work queues and two completion queues for the single connection.

FIG. 2B illustrates a more specific embodiment 200B of the connection environment 200A of FIG. 2A. Here, there are two completion queues 201B and 202B, and two work queues 211B and 212B. There might further be a correlation between start and completion queues. For instance, completion queue 201B might correlate to work queue 211B and completion queue 202B might correlate to work queue. In this case, the software 210 places work requests of a first set of one of more types into the first work queue 211B, whereupon the network interface card 220 completes the request, and places the completion data in the first completion queue 201B. Likewise, the software 210 places work requests of a second set of one of more types into the second work queue 212B, whereupon the network interface card 220 completes the request, and places the completion data in the second completion queue 202B. Thus, the software 210 views the work queues 211B, 212B as being the beginning 230B1 of a network connection channel, and the completion queues 201B and 202B as being the end 230B2 of a network connection channel. The connection channel that forms the beginning 230B1 and end 230B2 will also be referred to herein as the "network connection 230B".

In one example, the work queues 211B and 212B of FIG. 2B might be a send and receive queue. In that case, the completion queues 201B and 202B of FIG. 2B might be a send complete queue and a receive complete queue, respectively. For instance, the connection 230A of FIG. 2A or connection 230B of FIG. 2B may be a Remote Direct Memory Access (RDMA) connection. Such might be the case, if the network interface card 220 were an RDMA-enabled Network Interface Card (RNIC).

The environments 200A and 200B might be implemented in the computing system 100 of FIG. 1. For instance, the software 210 might be operated on the computing system 100 in response to the one or more processors 102 executing computer-readable instructions. Such computer-readable instructions may be embodied on computer-readable storage media as part or all of a computer program product.

Figure 3:
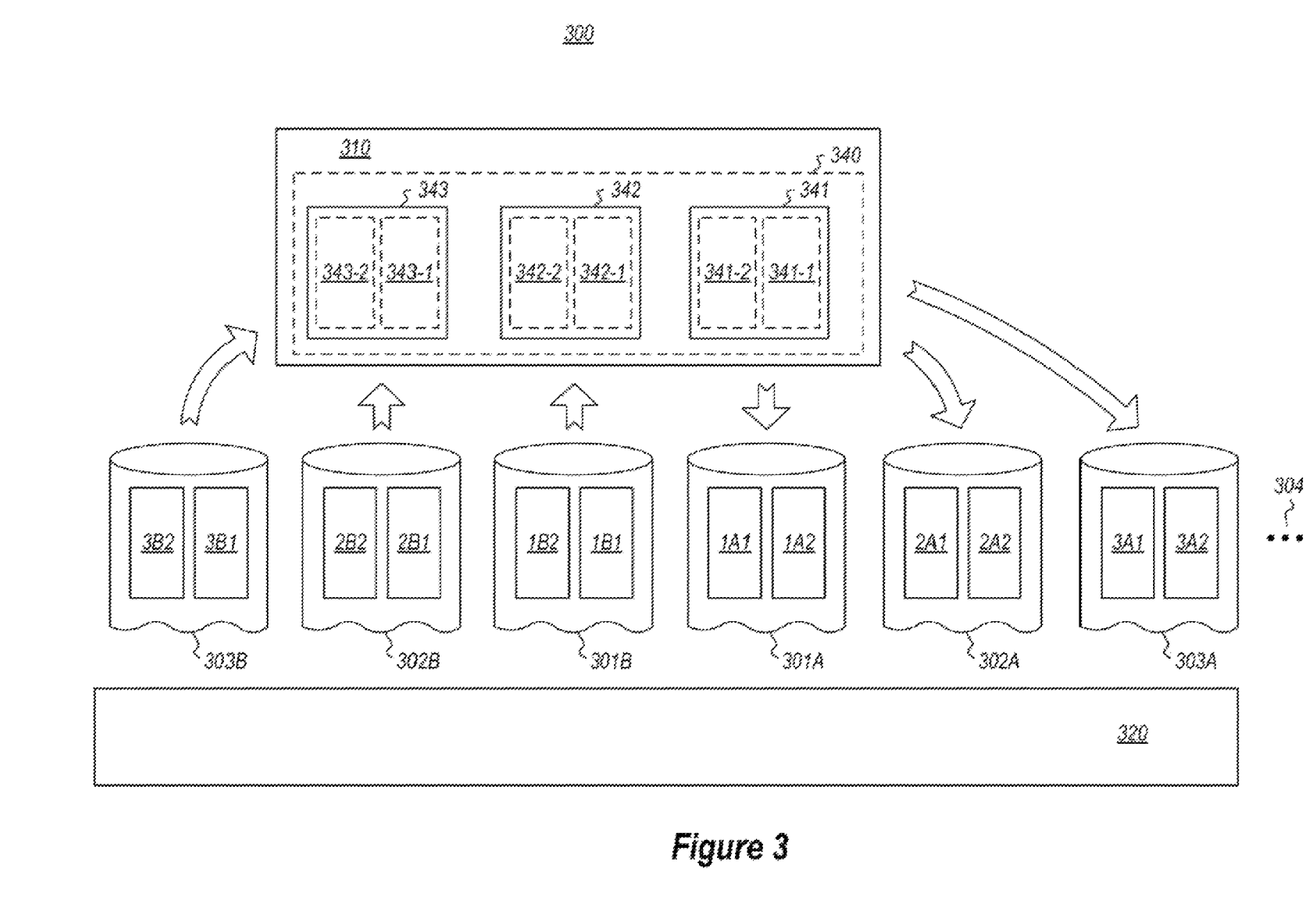
FIG. 3 illustrates an environment that is similar to the FIG. 2B, except that there are multiple network connection channels illustrated.

FIG. 3 illustrates an environment 300 that is similar to the environment 200B of FIG. 2B, except that there are multiple network connection channels illustrated including network connections 301, 302 and 303. The software 310 places the work request into the appropriate work queue of the appropriate network connection at the beginning of the connection (e.g., connection beginning 301A, 302A and 303A in the case of respective connections 301, 302 and 303). The network interface card 320 processes the work request and places the work completion into the appropriate completion queue at the end of the network connection (e.g., connection ending 301B, 302B and 303B in the case of respective connections 301, 302 and 303). For instance, the software 310 introduces work requests into the work queues 1A1, 1A2, 2A1, 2A2, 3A1 and 3A2, which are then processed by the network interface card 320 with the work completion placed in the respective work completion queue 1B1, 1B2, 2B1, 2B2, 3B1 and 3B2. In one embodiment, the queues 1A1, 2A1 and 3A1 are send work queues, the queues 1A2, 2A2 and 3A2 are receive work queues, the queues 1B1, 2B1 and 3B1 are send complete queues, the queues 1B2, 2B2 and 3B2 are receive complete queues.

The ellipses 304 represent that there may be any number of network connections being handled by the network interface card 320. For instance, there may be as few as one or two connections, but potentially as many as thousands of connections for a single network interface card. The principles described herein are, however, not limited to the number of network connections.

The environment 300 might be implemented in the computing system 100 of FIG. 1. For instance, the software 300 might be operated on the computing system 100 in response to the one or more processors 102 executing computer-readable instructions. Such computer-readable instructions may be embodied on computer-readable storage media as part or all of a computer program product.

The work completions are of such a nature, that without interrupt moderation, an interrupt would be signaled into the execution of the software 310 each time a work completion is placed into a completion queue. If this process remains unmoderated, the software 310 might be frequently interrupted. Given that each interrupt might cause significant processor resources involved with the task of handling the interrupt or switching contexts, such can reduce the performance of the computing system.

Moderation may be performed by delaying the interrupt such that potentially more than one work completion indications are aggregated in a single interrupt. This reduces the number of interrupts that the software 310 handles. On the downside, such interrupt delay does, in fact, delay the notification to the software 310 that the work request has completed, thus introducing latency into the system. Thus, the ideal amount of moderation might be achieved only by balancing the benefits of aggregation with the potential downside of introduced delay.

In accordance with the principles described herein, the moderation decision regarding how much to aggregate may be made on a per connection or per completion queue basis. For instance, if one connection has a workflow in which a work request is not often made, and when made, is but a single work request, then that connection might be entirely unmoderated since waiting to aggregate further work completions will so often prove a fruitless delay. On the other hand, it may be acceptable to wait for several work completions to accumulate if there are a number of work requests outstanding for that connection. Further benefit may be obtained by evaluating different types of operations on a single connection. For instance, moderation may be performed per receive queue and per send queue for each connection.

Accordingly, the software 310 is illustrated as including moderation component 340. The moderation component 340 is able to perform moderation on a per-channel basis. For instance, the function of performing moderation for network connections 301, 302 and 303 are illustrated as corresponding to functions 341, 342 and 343, respectively. Such functions may be implemented by a single moderation component, or perhaps by multiple components. Alternatively or in addition, the moderation component 340 may also be able to perform moderation on a per-queue basis. For instance, the function of performing moderation for completion queues 1B1, 1B2, 2B1, 2B2, 3B1 and 2B2 are illustrated as corresponding to functions 341-1, 341-2, 342-1, 342-2, 343-1 and 343-1, respectively. Again, such functions may be implemented by a single moderation component, or perhaps by multiple components.

Although FIG. 3 has been described as having two completion queues and two work queues per channel, this need not be the case. Again, the principles may be applied also in the context of FIG. 2A in which there are any number of work queues and any number of completion queues per network connection, and any number of network connections per work queue or any number of network connections per completion queue.

Figure 4:
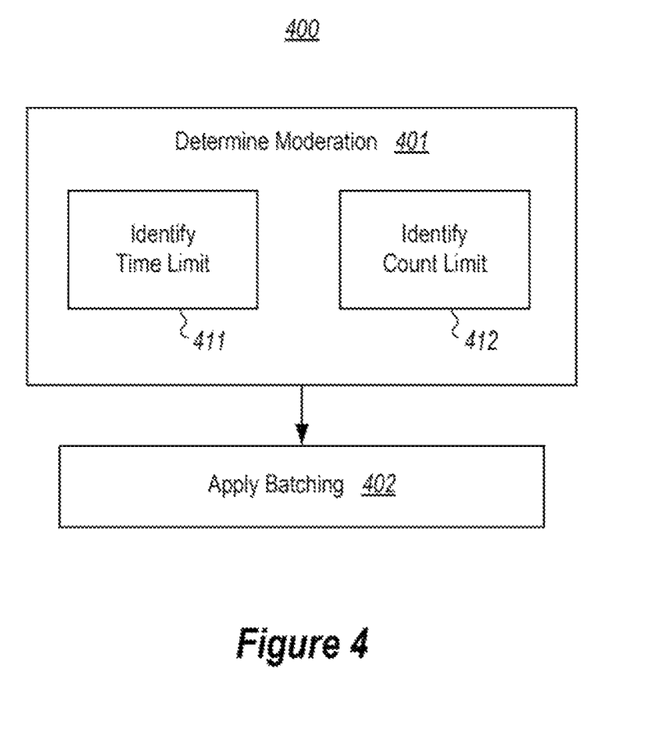
FIG. 4 illustrates a flowchart of a method for performing interrupt moderation in accordance with the principles described herein.

FIG. 4 illustrates a flowchart of a method 400 for performing interrupt moderation in accordance with the principles described herein. The method 400 may be performed by the moderation component 340 of FIG. 3 for each connection 301, 302 and 303 of FIG. 3 and/or for each completion queue of FIG. 3.

The method 400 includes determining a moderation to perform on a completion queue (act 401), and based on that determined moderation, adjusts the batching of one or more work completions (act 402) in the corresponding completion queue that will result in a single interrupt. The method 400 may be repeatedly performed for each completion queue such that the adjustment occurs in a dynamic fashion in response to changing workloads on the network connection.

The determining of the amount of moderation to apply (act 401) might involve determining a maximum time limit (act 411) as well as a maximum count (act 412) for signaling the presence of new work completions within the completion queue. For instance, the maximum time limit might be an estimate of the time at which a work completion will be obtained for the newest request in the corresponding work queue. The maximum count might be the maximum number of aggregated work completions in the completion queue. The maximum time limit and maximum count might then be adjusted to determine the amount of moderation to apply.

One specific example of how the maximum time limit and maximum count might be determined is as follows. In this example, "SQ" is the Send work queue of a connection, "RQ" is the receive work queue of the same connection, "SCQ" is the completion queue associated with SQ and "RCQ" is the completion queue associated with RQ. "WRO" is the number of active (but not yet completed) work requests on each work queue, and "WRPS" is the rate per second at which work completions are being added to each completion queue.

In this example, the maximum time limit might be calculated as the time expected for completion of some fraction of WRO outstanding work requests. The fraction might be considered as a moderation strength, chosen so as to provide some batching by signaling some work completions earlier than the expected time for the full WRO count, in order to process requests in an overlapped fashion. An example time limit might therefore be that fraction of WRO (e.g., 50 percent of WRO) divided by WRPS. Also, this limit might be calculated individually for SQ and RQ.

Also in this example, the maximum count might be calculated as a fraction of the count of outstanding work requests, WRO. Again, the fraction might be considered as a moderation strength, chosen so as to provide batching by signaling some completions earlier than the expected total, in order to process requests in an overlapped fashion. In the case of RQ, the limit might be chosen as a small constant, in order to not delay notification. In the case of SQ, the limit might be chosen to be higher (e.g., 50 percent of send work queue WRO).

In the example, consideration of both maximum time limit and maximum count allows for efficient processing without excessive delay. Individually, the maximum count would introduce delay, or even deadlock, if WRO were to decrease, or introduce unnecessary overhead, if WRPS were to increase. On the other hand, considering only the maximum time limit would severely limit throughput if either WRO or WRPS were to fall below a threshold. By considering both together, and adjusting each as these conditions change, these undesirable outcomes can both be avoided.

The adjusting of the batching (act 402) may occur by aggregating the signaling of whatever work completions are within the completion queue into a single interrupt in accordance with the moderation scheme determined to be applied to the completion queue. For instance, if a maximum time limit is determined (act 411), when that maximum time limit is arrived at, the moderation component may perform batching of whatever work completions are within the corresponding completion queue such that they are included within a single interrupt. On the other hand, if the maximum count is determined (act 412), when that maximum count is arrived at in terms of the number of actual work completions within the corresponding queue, those work completions may then be signaled in a single interrupt. If both a maximum time limit and maximum count are determined, then the arrival of either may signal an interrupt.

Accordingly, the principles described herein provide an effective mechanism for moderating interrupts by batching work completion in the completion queue. Furthermore, such may be performed on a per-connection or even per-completion queue basis, and independently on each side of the connection, thereby even further appropriately moderating based on the characteristics of the workflow for that connection.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. A system comprising:
   one or more processors;
   a network interface card comprising a plurality of work queues and a plurality of completion queues; and
   one or more computer-readable media having stored thereon computer-executable instructions that are executable by the one or more processors, and that configure the system to moderate aggregation of work completions on a per-network connection channel basis, including computer-executable instructions that configure the system to perform at least the following:
      identify a first network connection channel having a first work queue of the plurality of work queues at its beginning and a first completion queue of the plurality of completion queues at its end;
      identify a second network connection channel having a second work queue of the plurality of work queues at its beginning and a second completion queue of the plurality of completion queues at its end;
      based on activity of the first network connection channel, determine a first moderation to perform on the first completion queue, including calculating a first ratio between a number of active work requests in the first work queue and a rate at which work completions are added to the first completion queue;
      adjust aggregation of a set of first work completions in the first completion queue based on the first moderation, so that the set of first work completions are processed in a single interrupt;
      based on activity of the second network connection channel, determine a second moderation to perform on the second completion queue, including calculating a second ratio of a number of active work requests in the second work queue and a rate at which work completions are added to the second completion queue, the second moderation being different from the first moderation based on the first ratio being different from the second ratio; and adjust aggregation of a set of second work completions in the second completion queue based on the second moderation, so that the set of second work completions are processed in a single interrupt, a number of the set of second work completions being different from a number of the set of first work completions based on the first moderation being different from the second moderation.

2. The system in accordance with claim 1, wherein at least one of the plurality of completion queues comprises a send completion queue, and at least one of the plurality of completion queues comprises a receive completion queue.

3. The system in accordance with claim 1, wherein determining one or more of the first moderation or the second moderation comprises determining a maximum time limit for aggregating work completions in a corresponding completion queue.

4. The system in accordance with claim 1, wherein determining one or more of the first moderation or the second moderation comprises determining a maximum number of work completions in a corresponding completion queue.

5. The system in accordance with claim 1, wherein determining one or more of the first moderation or the second moderation comprises determining a maximum time limit over which to aggregate work completions in a completion queue.

6. A method, implemented at a computer system that includes one or more processors, for moderating aggregation of work completions on a per-network connection channel basis in a network interface card that has a plurality of work queues and a plurality of completion queues, the method comprising:
identifying a first network connection channel having a first work queue of the plurality of work queues at its beginning and a first completion queue of the plurality of completion queues at its end;
identifying a second network connection channel having a second work queue of the plurality of work queues at its beginning and a second completion queue of the plurality of completion queues at its end;
based on activity of the first network connection channel, determining a first moderation to perform on the first completion queue, including calculating a first ratio between a number of active work requests in the first work queue and a rate at which work completions are added to the first completion queue;
adjusting aggregation of a set of first work completions in the first completion queue based on the first moderation, so that the set of first work completions are processed in a single interrupt;
based on activity of the second network connection channel, determining a second moderation to perform on the second completion queue, including calculating a second ratio of a number of active work requests in the second work queue and a rate at which work completions are added to the second completion queue, the second moderation being different from the first moderation based on the first ratio being different from the second ratio; and
adjusting aggregation of a set of second work completions in the second completion queue based on the second moderation, so that the set of second work completions are processed in a single interrupt, a number of the set of second work completions being different from a number of the set of first work completions based on the first moderation being different from the second moderation.

7. The method in accordance with claim 6, wherein determining one or more of the first moderation or the second moderation comprises calculating average amount of work outstanding for the corresponding network connection channel.

8. The method in accordance with claim 6, wherein determining one or more of the first moderation or the second moderation comprises determining a maximum time limit for aggregating work completions in a corresponding completion queue.

9. The method in accordance with claim 8, wherein the maximum time limit is an increasing function of an amount of work outstanding for the network connection channel for the corresponding completion queue.

10. The method in accordance with claim 8, wherein the maximum time limit is a decreasing function of an amount of work requested completed per time period.

11. The method in accordance with claim 8, wherein the maximum time limit is a function of a moderation strength factor.

12. The method in accordance with claim 6, wherein determining one or more of the first moderation or the second moderation comprises determining a maximum number of work completions in a corresponding completion queue.

13. The method in accordance with claim 12, wherein the maximum number limit is an increasing function of an amount of work outstanding for the network connection channel for the corresponding completion queue.

14. The method in accordance with claim 12, wherein the maximum number limit is a function of a moderation strength factor.

15. A computer program product comprising one or more hardware storage devices having stored thereon one or more computer-executable instructions that are executable by one or more processors of a computing system, and that configure the computing system moderate aggregation of work completions on a per-network connection channel basis in a network interface card that has a plurality of work queues and a plurality of completion queues, including computer-executable instructions that configure the system to perform at least the following:
identify a first network connection channel having a first work queue of the plurality of work queues at its beginning and a first completion queue of the plurality of completion queues at its end;
identify a second network connection channel having a second work queue of the plurality of work queues at its beginning and a second completion queue of the plurality of completion queues at its end;
based on activity of the first network connection channel, determine a first moderation to perform on the first completion queue, including calculating a first ratio between a number of active work requests in the first work queue and a rate at which work completions are added to the first completion queue; adjust aggregation of a set of first work completions in the first completion queue based on the first moderation, so that the set of first work completions are processed in a single interrupt;
based on activity of the second network connection channel, determine a second moderation to perform on the second completion queue, including calculating a second ratio of a number of active work requests in the second work queue and a rate at which work completions are added to the second completion queue, the second moderation being different from the first moderation based on the first ratio being different from the second ratio; and adjust aggregation of a set of second work completions in the second completion queue based on the second moderation, so that the set of second work completions are processed in a single interrupt, a number of the set of second work completions being different from a number of the set of first work completions based on the first moderation being different from the second moderation.

16. The system in accordance with claim 3, wherein the maximum time limit is an increasing function of an amount of work outstanding for the network connection channel for the corresponding completion queue.

17. The system in accordance with claim 3, wherein the maximum time limit is a decreasing function of an amount of work requested completed per time period.

18. The system in accordance with claim 3, wherein the maximum time limit is a function of a moderation strength factor.

19. The system in accordance with claim 4, wherein the maximum number limit is an increasing function of an amount of work outstanding for the network connection channel for the corresponding completion queue.

20. The system in accordance with claim 4, wherein the maximum number limit is a function of a moderation strength factor.

* * * * *